US012741557B2

(12) United States Patent
Wang

(10) Patent No.: US 12,741,557 B2
(45) Date of Patent: Sep. 22, 2026

(54) TEMPERATURE CONTROL PROTECTION DEVICE AND CORRESPONDING CHARGING DEVICE

(71) Applicant: Changchun Jetty Automotive Technology Co., Ltd., Changchun (CN)

(72) Inventor: Chao Wang, Changchun (CN)

(73) Assignee: CHANGCHUN JETTY AUTOMOTIVE TECHNOLOGY CO., LTD., Changchun (CN)

( * ) Notice: Subject to any disclaimer, the term of this patent is extended or adjusted under 35 U.S.C. 154(b) by 757 days.

(21) Appl. No.: 18/031,852

(22) PCT Filed: Jun. 25, 2021

(86) PCT No.: PCT/CN2021/102338

§ 371 (c)(1),
(2) Date: Apr. 13, 2023

(87) PCT Pub. No.: WO2022/095471

PCT Pub. Date: May 12, 2022

(65) Prior Publication Data

US 2023/0406133 A1 Dec. 21, 2023

(30) Foreign Application Priority Data

Nov. 6, 2020 (CN) ........................ 202022550192.7

(51) Int. Cl.
*B60L 53/62* (2019.01)
*H02J 7/65* (2026.01)
(Continued)

(52) U.S. Cl.
CPC ................ *B60L 53/62* (2019.02); *H02J 7/65* (2026.01); *H02J 7/975* (2026.01); *G01K 7/22* (2013.01)

(58) Field of Classification Search
CPC ....................................................... B60L 53/62
(Continued)

(56) References Cited

U.S. PATENT DOCUMENTS 7,541,781 B2 6/2009 Gamboa
2006/0158156 A1* 7/2006 Gamboa ................ H02J 7/663 320/141

(Continued)

FOREIGN PATENT DOCUMENTS

CN 201562953 U 8/2010
CN 108797058 A 11/2018

(Continued)

OTHER PUBLICATIONS

International Search Report from corresponding International Application No. PCT/CN2021/102338, dated Sep. 27, 2021, 6 pages with translation.

(Continued)

*Primary Examiner* — Jerry D Robbins
(74) *Attorney, Agent, or Firm* — Tucker Ellis LLP

(57) ABSTRACT

A temperature control protection device and a corresponding charging device. The temperature control protection device includes: a temperature acquisition unit (101); a comparison unit (102) configured to compare an environment temperature signal with a preset reference voltage and output a first comparison result; a control unit (103) configured to compare the environment temperature signal with a preset threshold and output a second comparison result; a driving unit (104) configured to output a driving signal to a switch unit (105) according to the first comparison result or the second comparison result for switching on or off the switch unit (105); and the switch unit (105) configured to output charging current when being conducted. The temperature control protection device and the charging device with it according to the embodiments of the present disclosure realize the multiple protections of temperature monitoring during charging, and improve the charging safety.

11 Claims, 5 Drawing Sheets

(51) Int. Cl.
*H02J 7/90* (2026.01)
*G01K 7/22* (2006.01)

(58) Field of Classification Search
USPC .......................................................... 320/108
See application file for complete search history.

(56) References Cited

U.S. PATENT DOCUMENTS

2009/0146614 A1* 6/2009 Carrier ...................... B25F 5/00 320/152
2016/0138980 A1* 5/2016 Jefferies ................. G01K 13/00 374/141
2018/0229615 A1* 8/2018 Shumaker ............... B60L 53/16
2020/0044473 A1 2/2020 Katase
2020/0180449 A1* 6/2020 Lo ........................... B60L 53/18

FOREIGN PATENT DOCUMENTS

CN 208849444 U * 5/2019 ............... H02H 5/04
CN 110311356 A 10/2019
CN 110943434 A 3/2020
CN 212447189 U 2/2021

OTHER PUBLICATIONS

Extended European Search Report from corresponding European Application No. 21888174.6, dated Jun. 4, 2024, 8 pages.

* cited by examiner

TEMPERATURE CONTROL PROTECTION DEVICE AND CORRESPONDING CHARGING DEVICE

CROSS-REFERENCE TO RELATED APPLICATIONS

This application claims priority to Chinese Patent Application No. 202022550192.7, filed on Nov. 6, 2020, entitled "temperature control protection device and corresponding charging device", which is hereby incorporated by reference in its entirety.

TECHNICAL FIELD

The present disclosure relates to the technical field of charging, and particularly to a temperature control protection device and a corresponding charging device.

BACKGROUND

In the current world and China markets, new energy vehicles have been continuously promoted and popularized, and the retention thereof is greatly increased year by year. With the increase of the retention of the new energy vehicles, corresponding chargers for charging the new energy vehicles are also increasing sharply.

With the development of the power supply technologies and the popularization of the electric vehicles, the safety of power utilization has become a common concern for users. Currently, excessive temperature of the charging device may lead to damage of internal components of the charging device or fire, thereby causing property losses or threatening the personal safety.

In the prior art, the temperature of the charging device is detected by a temperature-sensitive resistor to determine whether the temperature exceeds a preset temperature threshold. When the temperature exceeds the temperature threshold, the charging current to the vehicle is cut off, and when the temperature is lower than the temperature threshold, the charging current is kept charging the vehicle.

The inventor of the present disclosure finds that the above prior art has at least the disadvantages that the temperature control protection of the charging device relies on a single-mode temperature control protection device, and once the temperature control protection device is invalid, a fire risk will be caused due to an excessive temperature of the charging device. Therefore, there is an urgent need for those skilled in the art to solve the problem of the single-mode temperature control protection of the charging device.

SUMMARY

Aiming at the problem in the prior art, the embodiments of the present disclosure provide a temperature control protection device and a corresponding charging device, to solve the problem in the prior art that relying on a single-mode temperature control protection is less safe for a charging device or a charging process.

In an aspect, an embodiment of the present disclosure provides a temperature control protection device, including a temperature acquisition unit, a comparison unit, a control unit, a driving unit, and a switch unit;

- the temperature acquisition unit is configured to obtain an environment temperature signal;
- the comparison unit is connected between the temperature acquisition unit and the driving unit, and configured to compare the environment temperature signal with a preset reference voltage and output a first comparison result;
- the control unit is connected between the temperature acquisition unit and the driving unit, and configured to compare the environment temperature signal with a preset threshold and output a second comparison result;
- the driving unit includes an input end connected to the comparison unit and the control unit, and an output end connected to the switch unit, and the driving unit is configured to output a driving signal to the switch unit according to the first comparison result or the second comparison result, for switching on or off the switch unit; and
- the switch unit is configured to outputs current when being switched on.

In another aspect, an embodiment of the present disclosure further provides a charging device with the temperature control protection device.

Through the temperature control protection device and the charging device with it according to the embodiments of the present disclosure, it is possible to realize the multiple protections of temperature monitoring during charging, and improve the charging safety. Through the hysteresis comparator, it is possible to avoid the instability of the charging device caused by the frequent switching of the switch unit when the temperature is close to the temperature threshold. By outputting both the first comparison result output by the comparison unit and the second comparison result output by the control unit to the input end of the driving unit, it is possible to cut off the charging current when any unit judges that the environment temperature exceeds the temperature threshold, thereby ensuring the safety of the charging device and avoiding the aging of components and the fire risk. By using a triode as the driving unit, the implementation cost is reduced, the stability of the system is ensured and the response is quick. By monitoring and compensating the reference voltage, the temperature control protection device may be regulated automatically for accuracy even in a long-time use. By regulating the power of the output charging current according to the real-time temperature of the charging device, it is possible to control the charging device to continue working safely when the temperature is within a certain allowable range, so that the fire may be prevented, the normal working efficiency of a charging gun may be improved to the maximum extent, the charging time may be shortened, and the user's experience may be improved. Therefore, it is possible to solve the problem in the prior art that the charging device stops charging when the temperature is detected to be too high such that the charging device cannot substantially guarantee the normal charging, the user's experience is greatly degraded, and the electric vehicle owner complains that the charging cannot be normally carried out. Of course, it is not necessary to achieve all the advantages mentioned above at the same time to implement any product and/or embodiment herein.

BRIEF DESCRIPTION OF THE DRAWINGS

For a clearer illustration of technical features in the embodiments of the present disclosure, a brief description of the drawings for the embodiments will be given below. Obviously, the drawings described below involve only some embodiments of this disclosure. For those of ordinary skill in the art, other drawings can be derived from these drawings without any inventive efforts.

REFERENCE SIGNS

101: temperature acquisition unit; 102: comparison unit; 103: control unit; 104: driving unit; 105: switch unit; 106: compensation unit; 300: temperature control protection device; 301: temperature acquisition unit; 302: comparison unit; 303: control unit; 304: driving unit; 305: switch unit; 306: compensation unit; 307: power regulation unit; 308: feedback unit; R1, R2, R3, R4, R5, R6, R7, R8: resistor; RT1: thermistor; U1: operational amplifier; D1, D2: diode; Q1, Q2, Q3: triode; K1: switch; VCC: power supply; $V_{REF}$: reference voltage; $V_i$: temperature voltage; $V_{out}$: output end.

DETAILED DESCRIPTION

The technical solutions in the embodiments of the present disclosure will be clearly and completely described below in conjunction with the drawings. Obviously, those described are merely a part, rather than all, of the embodiments of the present disclosure. All other embodiments derived by persons skilled in the art from the embodiments of the present disclosure without making inventive efforts shall fall within the protection scope of the present disclosure.

Figure 1:
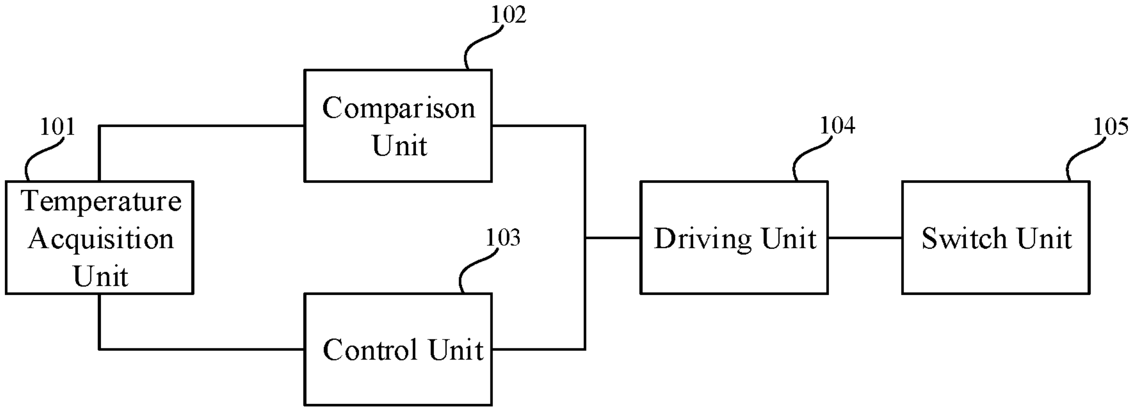
FIG. 1 is a schematic structural diagram of a temperature control protection device according to an embodiment of the present disclosure.

FIG. 1 is a schematic structural diagram of a temperature control protection device according to an embodiment of the present disclosure. FIG. 1 illustrates a device for detecting and protecting a charging process of an electric vehicle through a redundant design, thereby providing multiple protection for the charging safety of an electric vehicle such as an electric automobile, an electric bicycle, or an electric motorcycle. The temperature control protection device specifically includes a temperature acquisition unit 101, a comparison unit 102, a control unit 103, a driving unit 104, and a switch unit 105.

The temperature acquisition unit 101 is configured to obtain an environment temperature signal representing a use environment temperature.

The comparison unit 102 is connected between the temperature acquisition unit and the driving unit, and configured to compare the environment temperature signal with a preset reference voltage and output a first comparison result.

The control unit 103 is connected between the temperature acquisition unit and the driving unit, and configured to compare the environment temperature signal with a preset threshold and output a second comparison result.

The driving unit 104 includes an input end connected to the comparison unit 102 and the control unit 103, and an output end connected to the switch unit 105. The driving unit 104 is configured to output a driving signal to the switch unit 105 according to the first comparison result or the second comparison result for switching on or off the switch unit 105.

The switch unit 105 is configured to outputs charging current when being switched on.

The environment temperature signal may include signals such as voltage and current of the use environment temperature obtained by a sensor. The first comparison result and the second comparison result may be in the form of voltage or current.

The switch unit is controlled by the comparison results output by the comparison unit and the control unit in the above embodiments of the present disclosure. When one of the comparison results is a switch-off signal, the switch unit is switched off to stop the output of the charging current to the outside, thereby realizing multiple protection for temperature monitoring in the charging process and improving the charging safety.

Figure 2:
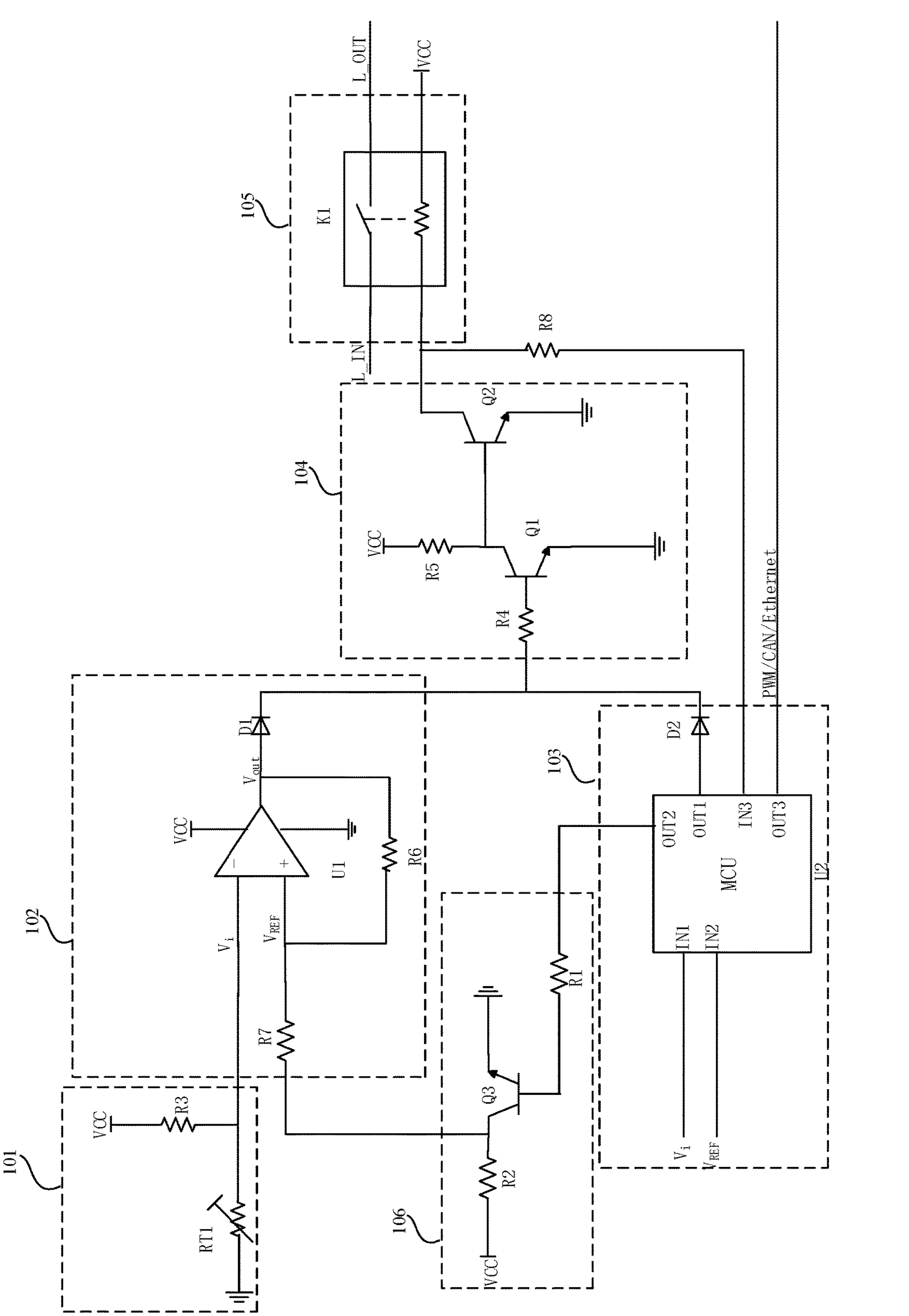
FIG. 2 is a schematic diagram of a specific circuit structure of a temperature control protection device according to an embodiment of the present disclosure.

FIG. 2 is a schematic diagram of a specific circuit structure of a temperature control protection device according to an embodiment of the present disclosure. FIG. 2 illustrates a specific circuit structure of the temperature control protection device. The temperature acquisition unit 101 may be a thermistor, a thermocouple, a resistance temperature detector, a digital sensor, or the like. The thermistor may be a Positive Temperature Coefficient (PTC) type thermistor or a Negative Temperature Coefficient (NTC) type thermistor, such as the NTC type thermistor RT1 shown in FIG. 2. Temperature information of the use environment or temperature information of the eletronic components in the charging device reflected by each different temperature acquisition unit can be expressed as a different temperature voltage. In this embodiment, a power input end of the temperature acquisition unit 101 is further connected to a voltage dividing resistor R3 for setting the temperature voltage output by the temperature acquisition unit 101 to meet the requirements of the comparison unit 102.

As an aspect of the embodiments of the present disclosure, the comparison unit 102 may be a comparator, including a first input end connected to the temperature acquisition unit 101, a second input end connected to a reference voltage, and an output end connected to the driving unit 104.

As an aspect of the embodiments of the present disclosure, the comparison unit 102 is a hysteresis comparator, including a first input end connected to the temperature voltage output by the temperature acquisition unit 101, a second input end connected to the reference voltage through a resistor R7, and an output end connected to an input end of the driving unit 104 to input the first comparison result to the driving unit 104. The output end of the hysteresis comparator is connected to the second input end through a resistor R6 connected in series.

In a case where there is only one reference voltage, when the amplitude of the temperature voltage input by the first input end of the comparison unit is close to the reference voltage, it is possible to cause an erroneous jump of the output voltage if the noise interference of the first input end is large and the comparison response speed is fast enough. In order to increase an anti-interference capability of the comparison unit, the embodiment provides the hysteresis comparator, which means that two reference voltages are provided. When the input temperature voltage changes from a low level to a high level, the output of the comparison unit will not change unless the temperature voltage reaches a first reference voltage; and when the input temperature voltage changes from a high level to a low level, the output of the comparison unit will not change unless the input temperature voltage decreases to a second reference voltage. Therefore, the structure of the comparison unit in the above embodiments has a hysteresis, i.e., an inertia, so that a slight change of the input temperature voltage does not cause a jump of the output voltage of the comparison unit, and then the comparison unit has an anti-interference capability.

The first comparison result output by the comparison unit 102 may be of a high level or a low level, which depends on the structure of the driving unit 104, and has the same meaning as a high level and a low level of the second comparison result output by the control unit 103 according to a comparison between the temperature voltage and the preset threshold described later. That is, for example, when the first comparison result output by the comparison unit 102 indicates that the use environment temperature (temperature voltage) is higher than a preset temperature (reference voltage), the first comparison result of high level is output. At this time, the control unit 103 should also output the second comparison result of high level when judging that the use environment temperature (temperature voltage) is higher than the preset temperature (preset threshold), and vice versa. In this way, the high levels of the output comparison results are of the same meaning, and the low levels of the output comparison results are of the same meaning, thereby realizing the multiple temperature control protection.

As an aspect of the embodiments of the present disclosure, the control unit 103 is connected to the temperature acquisition unit 101 to obtain the temperature voltage; and the control unit 103 is connected to the input end of the driving unit 104 to output the second comparison result to the driving unit 104.

In this embodiment, the control unit 103 may be a microprocessor (MCU), which receives a signal through IN pins (IN1 to IN 3), outputs the signal through OUT pins (OUT1 to OUT3), converts the temperature voltage into a digital form, and then compares the temperature voltage in the digital form with the preset threshold. For example, when the value of the temperature voltage is greater than the preset threshold, the OUT1 pin outputs the second comparison result indicating to switch off the switch unit 105, and when the value of the temperature voltage is less than the preset threshold, the OUT1 pin outputs the second comparison result indicating to switch on the switch unit 105, wherein the second comparison result may be of high level or low level, which depends on the structure of the driving unit 104.

As an aspect of the embodiments of the present disclosure, the driving unit 104 includes a first triode Q1, and a second triode Q2 is omitted compared with FIG. 2. The first triode Q1 includes a collector connected to a power supply VCC, a base connected to the comparison unit 102 and the control unit 103 for receiving both the first comparison result output by the comparison unit 102 and the second comparison result output by the control unit 103, and an emitter that is grounded. The collector is further connected to the switch unit 105. When the first triode Q1 is turned on, the switch unit 105 is switched on, and when the first triode Q1 is turned off, the switch unit 105 is switched off. The switch unit 105 with various structures may be designed according to FIG. 2, so that the switch unit 105 can be switched on or off depending on the turn-on or turn-off of the first triode Q1.

In this embodiment, in a case where the base is connected to the comparison unit 102 and the control unit 103 and receives both the first comparison result output by the comparison unit 102 and the second comparison result output by the control unit 103, when either of the first comparison result and the second comparison result is of high level, the first triode Q1 will be turned on. That is, when the comparison unit 102 determines that the use environment temperature at present exceeds the preset temperature and outputs the first comparison result of high level, or the control unit 103 determines that the use environment temperature at present exceeds the preset temperature and outputs the second comparison result of high level, the base of the first triode Q1 will receive the high level, so that the first triode Q1 is turned on, thereby switching on the switch unit 105.

As an aspect of the embodiments of the present disclosure, the driving unit 104 includes a first triode Q1 and a second triode Q2. The first triode Q1 includes a collector connected to the power supply VCC, a base connected to the comparison unit 102 and the control unit 103 for receiving both the first comparison result output by the comparison unit 102 and the second comparison result output by the control unit 103, and an emitter that is grounded. The second triode Q2 includes a collector connected to the switch unit 105, a base connected to the collector of the first triode Q1, and an emitter that is grounded. When the first triode Q1 is turned on, the second triode Q2 is turned off and the switch unit 105 is switched off. When the first triode Q1 is turned off, the second triode Q2 is turned on and the switch unit 105 is switched on.

In the above embodiments, the function of the driving unit 104 may also be realized by other means, and a PNP triode or an MOS transistor may be used to drive the switch unit 105, and the switch unit is, for example, a relay. For example, the first comparison result output by the comparison unit 102 may be converted into a digital form and then OR-operated with the second comparison result in a digital form output by the control unit 103. When one of the first and second comparison results in digital form is of high level, it means that the environment temperature exceeds the preset temperature, and the switch unit 105 is switched off. The above judgment and operation may be realized by a gate circuit in a digital circuit or any other form of judgment and operation circuit, which will not be described here.

As an aspect of the embodiments of the present disclosure, the temperature control protection device further includes a compensation unit 106, which is connected between the comparison unit 102 and the control unit 103. When detecting a deviation of the reference voltage, the control unit 103 outputs a regulation voltage to the compensation unit 106 to regulate the reference voltage.

In this embodiment, when the reference voltage drifts due to aging of the electrical components that output the reference voltage to the comparison unit 102 or changing of the electrical components resulting from the change of the environment temperature, the reference voltage may be regulated by the control unit 103 so as to be more accurate, thereby improving the accuracy of the temperature judgment by the comparison unit 102. The control unit 103 obtains the reference voltage, generates a regulation voltage for the reference voltage according to the comparison between the temperature voltage and the preset threshold, and applies the regulation voltage to the reference voltage.

As an aspect of the embodiments of the present disclosure, the compensation unit 106 further includes a third triode Q3, which includes a collector connected to the power supply VCC and the reference voltage of the comparison unit 102, a base connected to the control unit 103, and an emitter that is grounded. When the control unit 103 determines that the received reference voltage is not equal to the preset threshold, the OUT2 pin of the control unit 103 outputs the regulation voltage to the base of the third triode Q3 to control the reference voltage on the collector of the third triode Q3.

In this embodiment, the input pin of the control unit 103 is connected to the reference voltage of the second input end of the comparison unit 102 to obtain the reference voltage of the second input end of the comparison unit 102. When the reference voltage drifts due to the change of the electrical components, the reference voltage obtained by the control unit 103 is not equal to the preset threshold. For example, the set reference voltage is 0.5V, and the set preset threshold is also 0.5V, but the drifted reference voltage is 0.48V. At this time, when determining that the obtained reference voltage is different from the preset threshold, the control unit 103 controls the output pin to output the regulation voltage and turn on the third triode Q3, so that the reference voltage input to the second input end of the comparison unit 102 can be regulated from 0.48 V back to the set 0.5V.

As an aspect of the embodiments of the present disclosure, the control unit 103 further includes a first output pin configured to output a pulse modulation signal (PWM) according to the temperature voltage to regulate the power of the output charging current, and output the pulse modulation signal to the electric vehicle through an interface connected to the electric vehicle.

In this embodiment, as the temperature of the charging device increases or decreases, the control unit 103 may decrease or increase the power of the output charging current according to the degree of the temperature increase or decrease (in increasing, the temperature does not reach the preset threshold, i.e., the temperature does not exceed a safe charging temperature). For example, for an AC charging device, the charging current is regulated from 8 A to 6 A by a PWM signal due to the temperature increase. The PWM signal for regulating the output charging power is transmitted to a battery management system (BMS) of an electric vehicle, and the BMS system charges a battery with the corresponding charging current through a power regulation unit of the electric vehicle. Thus, the control of reducing the charging current intensity can be realized, and the charging of the electric vehicle can be maintained after the temperature of the charging device increases, without directly stopping the charging of the electric vehicle by the charging device as in the prior art, thereby improving the charging efficiency and the user's experience in charging the electric vehicle.

As an aspect of the embodiments of the present disclosure, the control unit 103 further includes a second output pin configured to output a charging power regulation signal (CAN/Ethernet) according to the temperature voltage, and output the charging power regulation signal to the electric vehicle through an interface connected to the electric vehicle.

The temperature control protection device further includes a power regulation unit, which is connected between the control unit 103 and the switch unit 105 and configured to regulate the power of the output charging current according to the charging power regulation signal.

In this embodiment, as the temperature of the charging device increases or decreases, the control unit 103 may decrease or increase the power of the output charging current according to the degree of temperature increase or decrease (in increasing, the temperature does not reach the preset threshold, i.e., the temperature does not exceed a safe charging temperature). For example, for a DC charging device, the control unit 103 outputs a charging power regulation signal to the power regulation unit to decrease or increase the power of the charging current output by the power regulation unit. When the temperature of the charging device exceeds the preset threshold, i.e., the safe charging temperature, the control unit 103 or the comparison unit 102 outputs a driving signal which drives the switch unit 105 to be switched off. When the switch unit 105 is switched off, the power regulation unit stops outputting the charging current to the electric vehicle, so as to reduce the temperature inside the charging device and the battery of the electric vehicle and ensure the safety of the charging process. The charging power regulation signal output by the control unit 103 may also be transmitted to the BMS system of the electric vehicle through a CAN bus or an Ethernet bus of a charging gun on the charging device, and the BMS system uses the charging current output by the switch unit 105 of the charging device to charge the battery with corresponding power according to the charging power regulation signal. Thus, the control of reducing the charging current intensity can be realized, and the charging of the electric vehicle can be maintained after the temperature of the charging device rises, without directly stopping the charging of the electric vehicle by the charging device as in the prior art, thereby improving the charging efficiency and the user's experience in charging the electric vehicle.

Still referring to FIG. 2, the VCC is an anode (hereinafter referred to as a power supply for short) of a power supply voltage source, the GND is a cathode of the power supply voltage source, the $V_{REF}$ is a reference voltage, i.e., a set temperature threshold, which is connected to a resistor R7, and the other end of the resistor R7 is connected to a positive input pin (second input end) of an operational amplifier. The reference voltage $V_{REF}$ may be a fixed value, or a preset threshold inside the control unit 103, in which case the temperature threshold can be automatically regulated by the temperature control protection device. A thermistor RT1 is a thermosensitive element, with one end grounded and the other end connected to a resistor R3 to constitute the temperature acquisition unit 101 that is connected to the input end of the comparison unit 102, i.e., a connection point between the resistor R3 and the thermistor RT1 is connected to a negative input pin (the first input end) of the operational amplifier U1. The thermistor RT1 and the resistor R3 constitute a voltage dividing circuit, and the thermistor RT1 may be an NTC type thermistor. When the environment temperature increases, the resistance value of the thermistor RT1 decreases, and the voltage value of the divided temperature voltage $V_i$ decreases, whereas when the temperature decreases, the $V_i$ increases. The resistor R6 is a feedback resistor connected between the output pin (output end) of the operational amplifier U1 and the positive pin (second input end).

When $V_i<V_{REF}$, the operational amplifier U1 outputs a high level; and when $V_i>V_{REF}$, U1 outputs a low level. $V_{out}$ is the output end of the operational amplifier U1, and the $V_{out}$ is connected to one end of a diode D1, the other end of the diode D1 is connected to a resistor R4, the other end of the resistor R4 is connected to the base of the first triode Q1 of the driving unit 104. One end of the resistor R5 is connected to the power supply VCC, and the other end of the resistor R5 is connected to the collector of the first triode Q1. Abase of the second triode Q2 is connected to a connection point between the collector of the first triode Q1 and the resistor R5, an emitter of the second triode Q2 is connected to the GND, and a collector of the second triode Q2 is connected to a control end of the switch unit 105. A switch K1 of a power supply network is used to control a path of the charging current supplied to the electric vehicle, and when the switch K1 is switched off, the charging current supplied to the electric vehicle is directly cut off to terminate the charging process. When the $V_{out}$ outputs a high level, the first triode Q1 is turned on and the second triode Q2 is turned off, and the switch K1 of the power supply network is switched off, so as to cut off the charging current output by the charging device to the electric vehicle. When the $V_{out}$ outputs a low level, the first triode Q1 is turned off, the second triode Q2 is turned on, and the switch K1 of the power supply network is switched on, so as to maintain the charging current output to the electric vehicle. L_IN, K1 and L_OUT constitute a path in the main power supply network. When the use environment temperature of the charging device or the temperature of the electrical components in the charging device exceeds the preset temperature threshold, the $V_{out}$ outputs a high level to disconnect the power supply network, and the charging current output by L_OUT is 0.

The thermistor RT1 may be integrated with other electrical components such as the operational amplifier U1 or disposed separately. There may be one or more thermistors RT1 located at different parts of the charging device to obtain the environment temperatures of those different parts or the temperatures (also referred to as the environment temperatures in other parts of the present disclosure) of the electrical components.

The operational amplifier U1 may be a hysteresis comparator to avoid the frequent switching of the switch unit 105 between a switched-on state and a switched-off state when the environment temperature of the switch K1 is close to the temperature threshold. When the environment temperature is higher than or equal to T1, the switch unit 105 is switched off, and when the environment temperature is lower than or equal toT2, the switch unit 105 is switched on, where T1>T2, and a value of T1 minus T2 may be changed by regulating the resistance values of the resistors R6 and R7. A hysteresis voltage width ΔV is determined by the equation: $\Delta V=(R7/R6)\times(VH-VL)$, where VH is the VCC and VL is 0V. Two threshold voltages u+ and u− of the hysteresis comparator are determined by the equations: $u+=(VH-V_{REF})\ xR7/(R7+R6)$, $u-=(VL-V_{REF})\times R7/(R7+R6)$. When the output voltage $V_{out}$ of the hysteresis comparator is equal to VH, $V_{REF}$=u+. When the temperature voltage $V_i$ is greater than $V_{REF}$, the output voltage $V_{out}$ of the hysteresis comparator is changed into VL, and $V_{REF}$ is also changed into u−. Under this condition, when the temperature voltage $V_i$ is less than $V_{REF}$, the output voltage $V_{out}$ is changed into VH. Since u+−u−=ΔV, the hysteresis comparator has a lower sensitivity than the ordinary comparator, but the anti-interference capability is greatly improved.

In order to improve the safety of the charging device, the control unit 103 obtains the temperature voltage $V_i$ and the reference voltage $V_{REF}$. When it is detected that the reference voltage $V_{REF}$ deviates from the preset threshold, i.e., the reference voltage $V_{REF}$ changes, the compensation unit 106 regulates and corrects the value of the reference voltage $V_{REF}$ to improve the accuracy of the temperature judgment. One output end of the control unit 103 is connected to the resistor R1, the other end of the resistor R1 is connected to the base of the third triode Q3, the emitter of the third triode Q3 is connected to the GND, the collector of the third triode Q3 is connected to one end of the resistor R2 and the reference voltage $V_{REF}$, and the other end of the resistor R2 is connected to the power supply VCC. The control unit 103 outputs a regulation voltage to control the duty cycle of the turned on third triode Q3, thereby regulating the reference voltage $V_{REF}$.

The control unit 103 further detects the state of the switch K1 through the feedback of a resistor R8 connected thereto. When the detected environment temperature exceeds the preset threshold and the switch K1 remains in a switched-on state, it means that the comparison unit 102 fails to control the switch K1. The control unit 103 compares the $V_i$ with the preset threshold, outputs a high level when the Vi reaches or exceeds the preset threshold, and turns on the first triode Q1 through the diode D2, and the second triode Q2 is turned off, thereby disconnecting the power supply network. The comparison unit 102 and the control unit 103 realize a dual detection of the temperature acquisition unit 101 and a dual control of the driving unit 104, thereby improving the safety of the charging device.

Figure 3A:
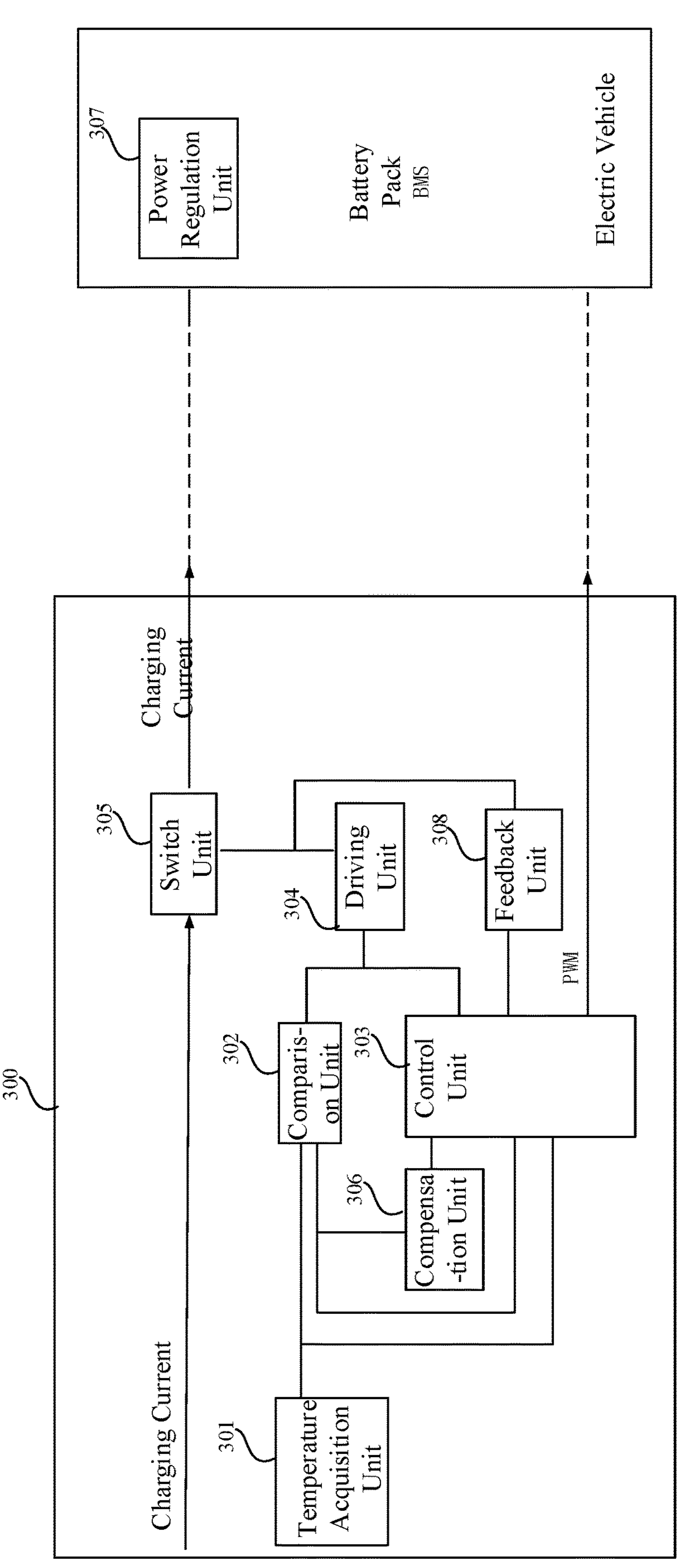
FIG. 3*a* is a schematic diagram of a temperature control protection device and an electric vehicle charging structure according to an embodiment of the present disclosure.

FIG. 3*a* is a schematic diagram of a temperature control protection device and an electric vehicle charging structure according to an embodiment of the present disclosure. In this embodiment, the charging device is an AC charging system. When the environment temperature rises but does not exceed the set temperature threshold, the control unit 303 of the temperature control protection device 300 modifies a duty cycle of a communication signal. For example, when the charging current is 8 A, the corresponding duty cycle (PWM signal) is 13.3%, and when the charging current is 6 A, the corresponding duty cycle (PWM signal) is 10% to regulate the power of the charging current. The control unit 303 outputs the modified communication signal to the power regulation unit 307 of the electric vehicle, and the power regulation unit 307 reduces the charging current intensity under the control of the BMS system of the electric vehicle, and stops charging the electric vehicle when the switch unit 305 is switched off. In other embodiments, the control unit 303 may also output a control signal of voltage to regulate the charging current.

In FIG. 3*a*, a feedback unit 308 is further included to obtain the driving signal output by the driving unit 304, so that the control unit 303 can judge whether the driving unit 304 correctly drives the switch unit 305.

Figure 3B:
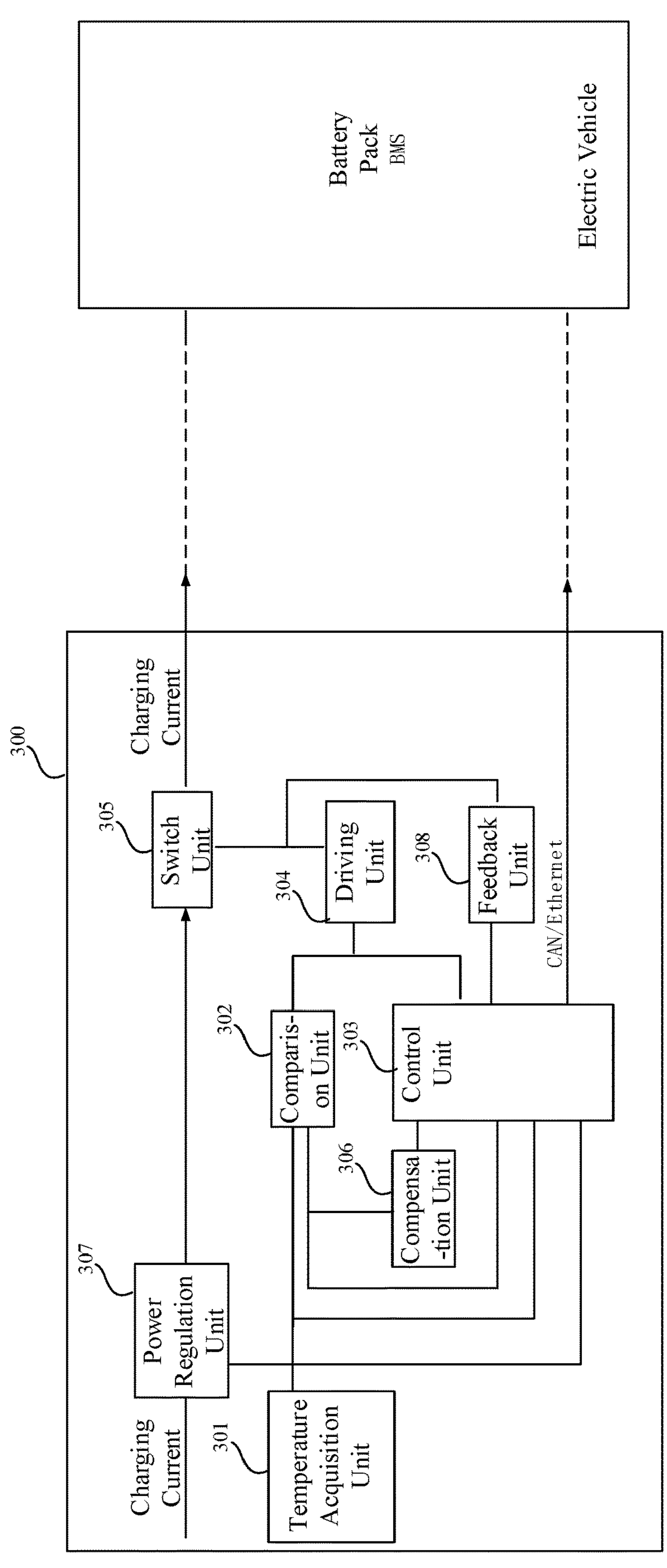
FIG. 3*b* is another schematic diagram of a temperature control protection device and an electric vehicle charging structure according to an embodiment of the present disclosure.

FIG. 3*b* is another schematic diagram of a temperature control protection device and an electric vehicle charging structure according to an embodiment of the present disclosure. In this embodiment, the charging device is a DC charging system. When the environment temperature rises but does not exceed the set temperature threshold, the control unit 303 of the temperature control protection device 300 regulates the power of the charging current to generate a charging power regulation signal, which is sent to the electric vehicle in the form of a CAN message through the CAN bus interface in the charging gun connected to the electric vehicle, thereby reducing the power of the charging current. Moreover, the charging power regulation signal is further output to the power regulation unit 307 in the temperature control protection device, and the power regulation unit 307 regulates the power of the output charging current (regulating the current, or the voltage, or the both) according to the charging power regulation signal, so as to charge the battery of the electric vehicle.

The power regulation unit 307 is configured to receive the charging current of the charging device, regulate the power of the charging current, and output the regulated power to the electric vehicle through the switch unit 305.

In the above embodiments, the temperatures of the charging device and the battery (and the charging parts) of the electric vehicle can be decreased by reducing the power of the charging current to charge the electric vehicle battery. When the temperature of the charging device is lower than another temperature threshold (i.e., a low temperature threshold), the temperature acquisition unit may obtain the environment temperature, and then the control unit may output a control command to the power regulation unit according to the environment temperature to restore the power of the charging current, thereby increasing the charging speed.

Figure 4A:
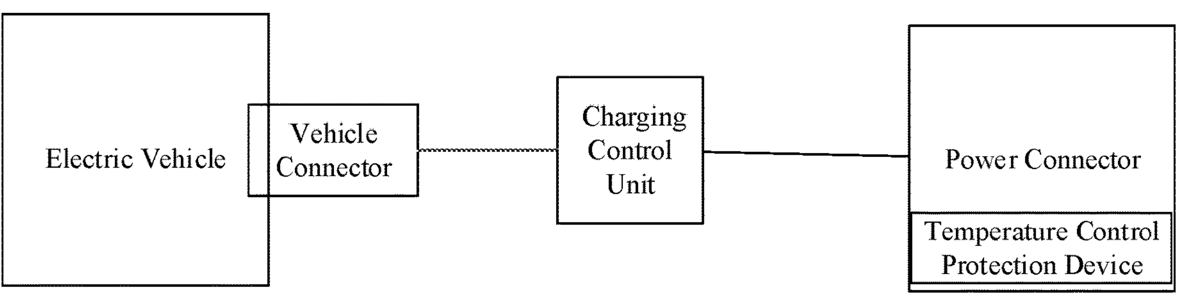
FIG. 4*a* is a schematic structural diagram of a temperature control protection device provided in a charging device according to an embodiment of the present disclosure.
Figure 4B:
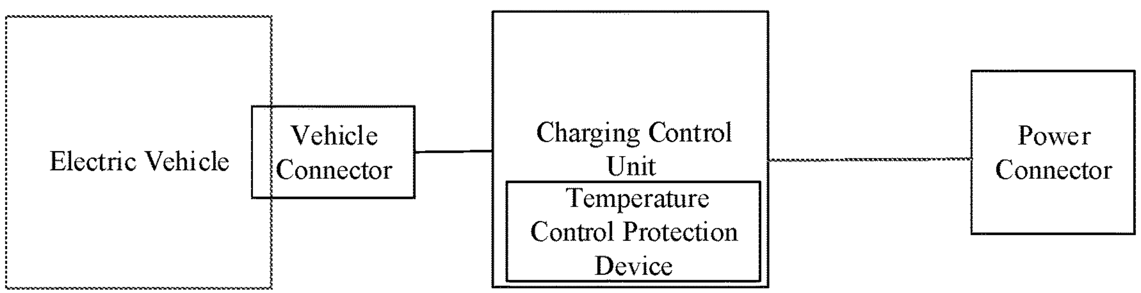
FIG. 4*b* is another schematic structural diagram of a temperature control protection device provided in a charging device according to an embodiment of the present disclosure.
Figure 4C:
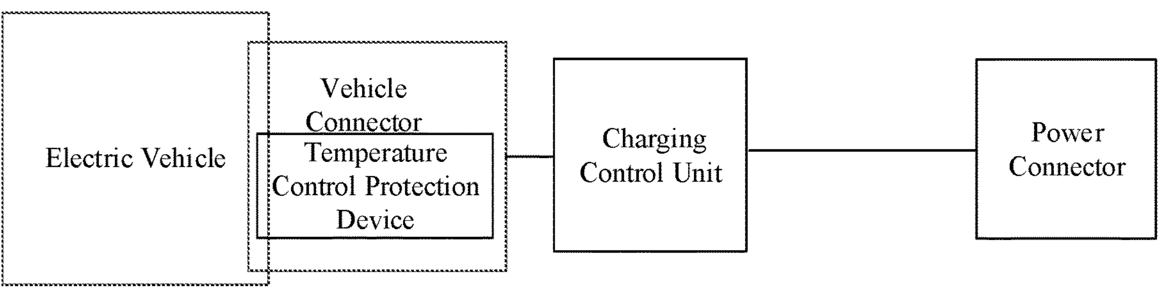
FIG. 4*c* is still another schematic structural diagram of a temperature control protection device provided in a charging device according to an embodiment of the present disclosure.

FIG. 4*a* is a schematic structural diagram of a temperature control protection device provided in a charging device according to an embodiment of the present disclosure, in which it is illustrated that the temperature control protection device mentioned above is disposed at a power connector of the charging device to detect temperatures of electrical components in the power connector or the environment temperature. For example, the temperature control protection device may be disposed at a power input portion of the charging device. FIG. 4*b* is another schematic structural diagram of a temperature control protection device provided in a charging device according to an embodiment of the present disclosure, in which it is illustrated that the temperature control protection device mentioned above is disposed at a charging control unit of the charging device to detect temperatures of electrical components in the charging control unit or the environment temperature. FIG. 4*c* is still another schematic structural diagram of a temperature control protection device provided in a charging device according to an embodiment of the present disclosure, in which it is illustrated that the temperature control protection device mentioned above is disposed at a vehicle connector of the charging device to detect temperatures of electrical components in the vehicle connector or the environment temperature. The vehicle connector may be, for example, a charging gun, a charging plug or the like. Of course, as the temperature acquisition unit of the temperature control protection device is disposed at different parts of the charging device, it is possible to detect the temperatures of the electrical components at different parts of the charging device or the environment temperature, no matter which part of the charging device is provided with the temperature control protection device.

Through the temperature control protection device and the charging device with it according to the embodiments of the present disclosure, it is possible to realize the multiple protections of temperature monitoring during charging, and improve the charging safety. Through the hysteresis comparator, it is possible to avoid the instability of the charging device caused by the frequent switching of the switch unit when the temperature is close to the temperature threshold. By outputting both the first comparison result output by the comparison unit and the second comparison result output by the control unit to the input end of the driving unit, it is possible to cut off the charging current when any unit judges that the environment temperature exceeds the temperature threshold, thereby ensuring the safety of the charging device and avoiding the aging of components and the fire risk. By using a triode as the driving unit, the implementation cost is reduced, the stability of the system is ensured and the response is quick. By monitoring and compensating the reference voltage, the temperature control protection device may be regulated automatically for accuracy even in a long-time use. By regulating the power of the output charging current according to the real-time temperature of the charging device, it is possible to control the charging device to continue working safely when the temperature is within a certain allowable range, so that the fire may be prevented, the normal working efficiency of a charging gun may be improved to the maximum extent, the charging time may be shortened, and the user's experience may be improved. Therefore, it is possible to solve the problem in the prior art that the charging device stops charging when the temperature is detected to be too high such that the charging device cannot substantially guarantee the normal charging, the user's experience is greatly degraded, and the electric vehicle owner complains that the charging cannot be normally carried out.

It should also be noted that in the embodiments of the present disclosure, the term 'and/or' is only an association relationship that describes the associated objects, indicating that there may be three relationships. For example, A and/or B may mean that A exists alone, both A and B exist, and B exists alone. In addition, the character 7' herein generally indicates that the associated objects are in an 'or' relationship.

The principles and the implementations of the present disclosure have been described above by means of some embodiments. The embodiments are meant to facilitate understanding of the method and the core idea of the present disclosure. Meanwhile, those of ordinary skilled in the art can modify the implementations and the application scope according to the idea of the present disclosure. To sum up, the contents of this specification should not be construed as limitations to the present disclosure.

The invention claimed is:

1. A temperature control protection device, comprising a temperature acquisition unit, a comparison unit, a control unit, a driving unit, a switch unit, and a compensation unit;

the temperature acquisition unit is configured to obtain an environment temperature signal;

the comparison unit is connected between the temperature acquisition unit and the driving unit, and configured to compare the environment temperature signal with a preset reference voltage and output a first comparison result;

the control unit is connected between the temperature acquisition unit and the driving unit, and configured to compare the environment temperature signal with a preset threshold and output a second comparison result;

the driving unit comprises an input end connected to the comparison unit and the control unit, and an output end connected to the switch unit, and the driving unit is configured to output a driving signal to the switch unit according to the first comparison result or the second comparison result for switching on or off the switch unit;

the switch unit is configured to outputs current when being switched on; and the compensation unit is connected between the comparison unit and the control unit; when detecting a deviation of the reference voltage, the control unit outputs a regulation voltage to the compensation unit to regulate the reference voltage.

2. The temperature control protection device according to claim 1, wherein the comparison unit is a comparator comprising a first input end connected to the temperature acquisition unit, a second input end connected to a reference voltage, and an output end connected to the driving unit.

3. The temperature control protection device according to claim 2, wherein the comparison unit is a hysteresis comparator, the temperature acquisition unit is configured to output the environment temperature signal, the second input end is connected to the reference voltage through a resistor R7, the output end is connected to an input end of the driving unit to input the first comparison result to the driving unit, and the output end is connected to the second input end through a resistor R6 connected in series.

4. The temperature control protection device according to claim 1, wherein the driving unit comprises a first triode Q1, which comprises a collector connected to a power supply VCC, a base connected to the comparison unit and the control unit for receiving both the first comparison result output by the comparison unit and the second comparison result output by the control unit, and an emitter that is grounded, wherein the collector is further connected to the switch unit; when the first triode Q1 is turned on, the switch unit is switched off, and when the first triode Q1 is turned off, the switch unit is switched on.

5. The temperature control protection device according to claim 1, wherein the driving unit comprises a first triode Q1 and a second triode Q2; the first triode Q1 comprises a collector connected to the power supply VCC, a base connected to the comparison unit and the control unit for receiving both the first comparison result output by the comparison unit and the second comparison result output by the control unit, and an emitter that is grounded; the second triode Q2 comprises a collector connected to the switch unit, a base connected to the collector of the first triode Q1, and an emitter that is grounded; when the first triode Q1 is turned on, the second triode Q2 is turned off and the switch unit is switched off; when the first triode Q1 is turned off, the second triode Q2 is turned on and the switch unit is switched on.

6. The temperature control protection device according to claim 1, wherein the compensation unit further comprises a third triode Q3, which comprises a collector connected to the power supply VCC and the reference voltage of the comparison unit, a base connected to the control unit, and an emitter that is grounded; when the control unit determines that the received reference voltage is not equal to the preset threshold, the control unit outputs the regulation voltage to the base of the third triode Q3 to control the reference voltage on the collector of the third triode Q3.

7. The temperature control protection device according to claim 1, wherein when the temperature control protection device is applied to an AC charging device, the control unit further comprises a first output pin configured to output a pulse modulation signal according to the environment temperature signal to regulate power of the output charging current, and output the pulse modulation signal to the electric vehicle through an interface connected to the electric vehicle.

8. The temperature control protection device according to claim 1, wherein when the temperature control protection device is applied to a DC charging device, the control unit further comprises a second output pin configured to output a charging power regulation signal according to the environment temperature signal, and output the charging power regulation signal to the electric vehicle through an interface connected to the electric vehicle; and the temperature control protection device further comprises a power regulation unit, which is connected between the control unit and the switch unit and configured to regulate power of the output charging current according to the charging power regulation signal.

9. The temperature control protection device according to claim 8, wherein the interface between the control unit and the electric vehicle comprises a CAN bus or an Ethernet.

10. A charging device, comprising the temperature control protection device according to claim 1.

11. The charging device according to claim 10, wherein the temperature control protection device is disposed at a power connector of the charging device; or the temperature control protection device is disposed at a charging control unit of the charging device; or the temperature control protection device is disposed at a vehicle connector of the charging device.

* * * * *